(12) United States Patent
Hothi

(10) Patent No.: US 9,434,474 B2
(45) Date of Patent: Sep. 6, 2016

(54) AIRCRAFT GALLEY CART DOOR INTERLOCK

(71) Applicant: B/E Aerospace, Inc., Wellington, FL (US)

(72) Inventor: Harkamal Singh Hothi, Buckinghamshire (GB)

(73) Assignee: B/E Aerospace, Inc., Wellington, FL (US)

( * ) Notice: Subject to any disclaimer, the term of this patent is extended or adjusted under 35 U.S.C. 154(b) by 121 days.

(21) Appl. No.: 14/080,442

(22) Filed: Nov. 14, 2013

(65) Prior Publication Data

US 2014/0137574 A1   May 22, 2014

Related U.S. Application Data

(60) Provisional application No. 61/727,593, filed on Nov. 16, 2012.

(51) Int. Cl.
   *F25D 17/06*   (2006.01)
   *B64D 11/00*   (2006.01)
   *B64D 11/04*   (2006.01)

(52) U.S. Cl.
   CPC .......... *B64D 11/0007* (2013.01); *B64D 11/04* (2013.01)

(58) Field of Classification Search
   CPC ............. F25D 17/065; F25D 2400/04; B60H 1/00371
   USPC ...................... 62/62, 89, 126, 244, 407, 506
   See application file for complete search history.

(56) References Cited

U.S. PATENT DOCUMENTS

| 6,845,627 | B1 * | 1/2005 | Buck ..................... B64D 11/04 165/919 |
| 7,500,684 | B2 | 3/2009 | Van Loon et al. |
| 7,765,818 | B2 * | 8/2010 | Buck .................... F25B 49/005 62/125 |
| 2010/0050665 | A1 | 3/2010 | Oswald et al. |
| 2011/0277489 | A1 * | 11/2011 | Schalla .................. A47B 31/02 62/89 |

FOREIGN PATENT DOCUMENTS

| DE | 102007032052 A1 | 1/2009 |
| EP | 2386811 A2 | 11/2011 |
| JP | S6433485 A | 2/1989 |
| JP | 2003214747 A | 7/2003 |

OTHER PUBLICATIONS

International Search Report, May 16, 2014, 5 pages.
Chinese Search Report, Jan. 4, 2016, 2 pages, from App. No. 2013800595379.

* cited by examiner

*Primary Examiner* — Melvin Jones
(74) *Attorney, Agent, or Firm* — Fulwider Patton LLP

(57) ABSTRACT

An aircraft galley compartment cooling system includes a source of chilled air, and a closed compartment with a door. A sensor detects the opening of the door, and sends a signal to the cooling system to deactivate while the door is opened to prevent ambient air from entering the cooling system. Once the door is closed, the cooling system is reactivated. The sensor can be a light sensor, a mechanical sensor, a magnetic sensor, or the like for determining movement or the presence/non-presence of the door to the compartment.

12 Claims, 4 Drawing Sheets

AIRCRAFT GALLEY CART DOOR INTERLOCK

CROSS-REFERENCES TO RELATED APPLICATIONS

This application claims priority from U.S. Application No. 61/727,593, filed Nov. 16, 2012, the contents of which are incorporated herein by reference in its entirety.

BACKGROUND

The present invention relates generally to aircraft galleys that include beverage and food cart storage compartments, and more particularly to a system to shut off the chilling system to the storage compartments when the compartment door is open to prevent moisture and warm air from entering the chilling unit.

Modern large commercial passenger carrying airplanes typically employ one of two methods for keeping perishable food stuffs and non-perishable drinks at temperatures capable of prolonging their usability and/or increasing their enjoyment, during short haul, long haul or ultra long haul aircraft journeys, where in-flight catering services are offered. The first method utilizes a vapor cycle cooling system having air chillers that utilize a conventional refrigerant gas compression and expansion operation to generate a secondary re-circulated chilled air loop. The chilled air is generally supplied and returned via thermally insulated air ducting to and from a suitable storage structure, such as a galley. The air chiller may be located on or in the galley, or mounted in part of the aircraft airframe.

The second method utilizes the same conventional refrigerant gas compression and expansion operation, but the cooling medium produced is a chilled liquid that is pumped in a closed loop to and from a suitable storage structure such as a galley. The chilled liquid may either be configured as: (1) a large centralized system for the whole aircraft; (2) be based at each separate aircraft door galley complex forming a local area chilling loop; or (3) be based on each individual galley as a standalone system. Within the galley, the liquid is passed, via a control valve and electronic control system, to a heat exchanger where an electric axial (or other) fan blows or sucks air through its matrix and around and enclosed areas of the storage structure that requires chilling, for example: a galley cart bay or compartment.

Both systems require that the closed areas of the storage structure, such as the bays that house the beverage carts, receive cooled air for as long as possible to maintain the required temperature. However, when the cart bay doors are left open for prolonged periods of time, the closed area is exposed to ambient air from the external galley area. Moisture from the ambient air can cause the evaporator within the chilling system to freeze and stop working, i.e., cut off the flow of air. With the chilling system not working, food cart temperatures can rise to unacceptable levels, which could result in the contents becoming hazardous to health.

SUMMARY OF THE INVENTION

The present invention is an interlock for a galley cart bay door that uses an active sensor, such as a reflective light sensor (e.g., infrared), a Hall Effect (magnetic field) sensor, mechanical switch, electromechanical switch or other system. A typical location would be within the galley, work deck cavity, galley walls, cart bay door or any other location adjacent a compartment opening. In the case of a beverage cart bay, when the cart bay door is opened to either access the cart, remove the cart, of for any other reason, the sensor sends a signal to a processor that the door is open, causing the processor to shut off the chilling unit. The deactivation of the chiller when the compartment is open to the ambient atmosphere prevents the introduction of warm air into the chilled compartment, in-turn preventing the evaporator from freezing due to moisture carried by the ambient air.

In one embodiment, the sensor incorporates a reflective light sensor in the interlock that can use various different sources in its operation. Infrared light is one preferred source because there is much less interference (from natural light), as opposed to standard LED and light sensors. Additionally, an IP photo-transistor could be used to receive the reflected infrared light as opposed to a standard LDR (Light Dependent Resistor, or "photo cells"), as the IR photo-transistor is much more sensitive to IR light. A simple IR reflective sensor system encompasses an IR LED and a IR Photo Transistor housed together and located within the work deck cavity or galley floor. The IR LED emits the IR light and this light is bounced back to the IR phototransistor by using the cart bay door top or bottom surface edge.

In a preferred embodiment of the present invention, the IR LED and IR phototransistor are connected to the chilling system via a cable and a processor. The reflected IR light creates a closed circuit by reflecting the IR light off the cart bay door. When the reflected IR light circuit is broken by the cart bay door being opened, a signal is sent to the processor to deactivate the chilling unit (either instantly or after a set time) until the circuit is restored (i.e., the door is closed).

In an alternate embodiment, a Hall Effect (magnetic field) sensor detects the presence of magnets located on the cart door. This method can be more reliable as there is no dependency on light. A simple Hall Effect sensor system encompasses a magnetic sensor housed and located within the work deck cavity or galley floor adjacent the bay door. A magnet would be fixed within the top or bottom surface edge of the cart bay door (or the sensor and magnet positions could be reversed), immediately proximate the Hall Effect sensor. The magnetic sensor would be connected to the chilling system via an electrical connection to a processor. The presence of a proximal magnet, i.e., within the cart bay door, creates a magnetic field and closes the circuit. When the magnetic field is broken, by the cart bay door being opened, the circuit is broken and the chilling unit will switch off (either instantly or after a set time).

A mechanical switch, snap-action switch, or micro switch (microswitch) is an electric switch actuated by a small physical force. In yet another embodiment, such a switch is placed with the work deck cavity or galley wall and makes physical contact with the galley cart bay door. The contact, such as by a long flat spring that is hinged at one end within the switch, has an electrical contact that carries a current. The long flat spring uses the physical force to maintain the closed circuit to allow continuous current flow. When the physical force (via the cart bay door) is moved, the long flat spring pivots away from the internal mechanism to break the circuit.

In each case, the sensor can either be located in or on the galley structure, or any other assembly adjacent to the cart bay, bonded, mechanically fixed or hung to the galley structure.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 3b is a side view of the galley door and work deck of FIG. 3a;

DETAILED DESCRIPTION OF THE PREFERRED EMBODIMENTS

Figure 1:
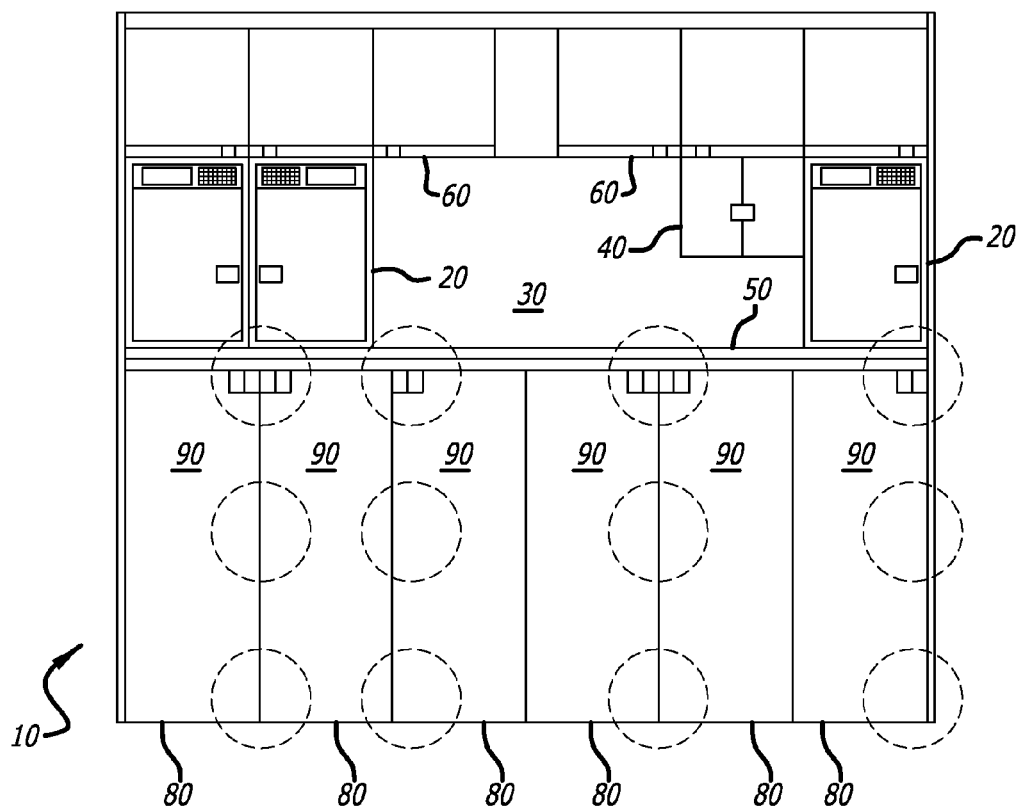
FIG. 1 is a front view of an aircraft galley with serving carts.

FIG. 1 is a front view of an aircraft galley 10, a structure that is used to prepare food and drink for passengers on the aircraft. The galley 10 incorporates many different features for food and beverage preparation, including refrigeration units 20, an area 30 for coffee/espresso makers, an oven 40, a work deck 50, storage cabinets 60 for storing cups, utensils, and the like. The galley also includes six beverage carts 70 that are housed in six beverage cart bays 80, where each bay 80 includes a front door 90 that enclose the carts 70 below the work deck 50. The cart bays 80 are chilled by a chiller, and the carts 70 can be removed from the galley 10 to service the passengers. The aircraft chiller system provides chilled air to the galley, including the bays 80 that hold the beverage carts 70 to keep the contents of the carts at the desired temperature.

Figure 2:
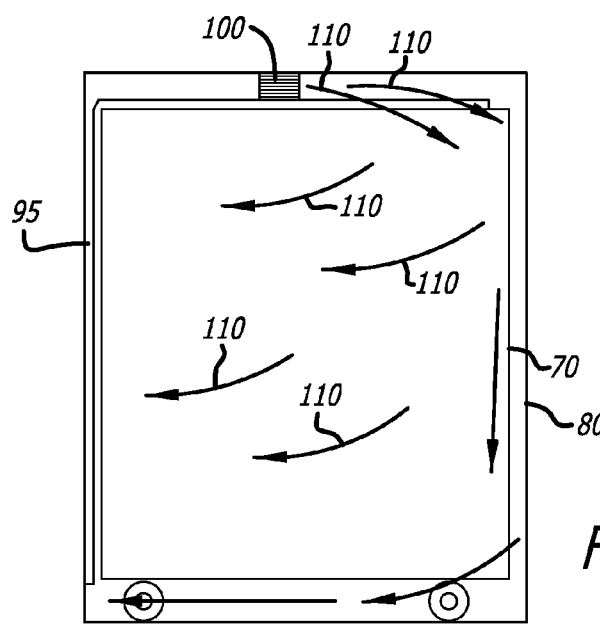
FIG. 2 is a side view of the galley cart in a cart bay, showing the ducting for the chiller.

FIG. 2 illustrates a beverage cart 70 housed in a cart bay 80 of the galley, where the cart bay 80 has a connection to a source 100 of chilled air 110. The chilled air 110 is generated from a vapor cycle air chiller or a liquid-vapor that may be in the galley 10, or may be located at another part of the aircraft and the cool air piped to the galley. A galley chiller system is described in U.S. patent application Ser. No. 13/852,702 filed Mar. 28, 2013, the contents of which are fully incorporated herein by reference. As shown in FIG. 2, the cool air 110 enters the cart bay 80 that houses the beverage cart 70, and the cool air 110 circulates over and around the cart 70. The circulated air 110 is returned to the chiller where it is recooled and recirculated in a closed cycle. Efficiency is promoted by reusing the circulated air, which is still cooler than the ambient air, and reduces the cooling capacity needed to maintain the galley and the food/beverages at the optimal temperature. As long as the cart bay door 90 is closed, the system remains closed and warm ambient air is prevented from entering the chiller closed loop system. However, once the cart bay door 90 is opened, warm ambient air from the cabin rushes into the cart bay 80, and this warm air is entrained into the chiller system. As discussed above, the intrusion of warm cabin air into the chiller system causes a buildup of ice, condensation, and other artifacts that prevent the chiller from operating properly. Therefore, it is desirable to deactivate the chiller system when the cart bay door 90 is opened.

Figure 3A:
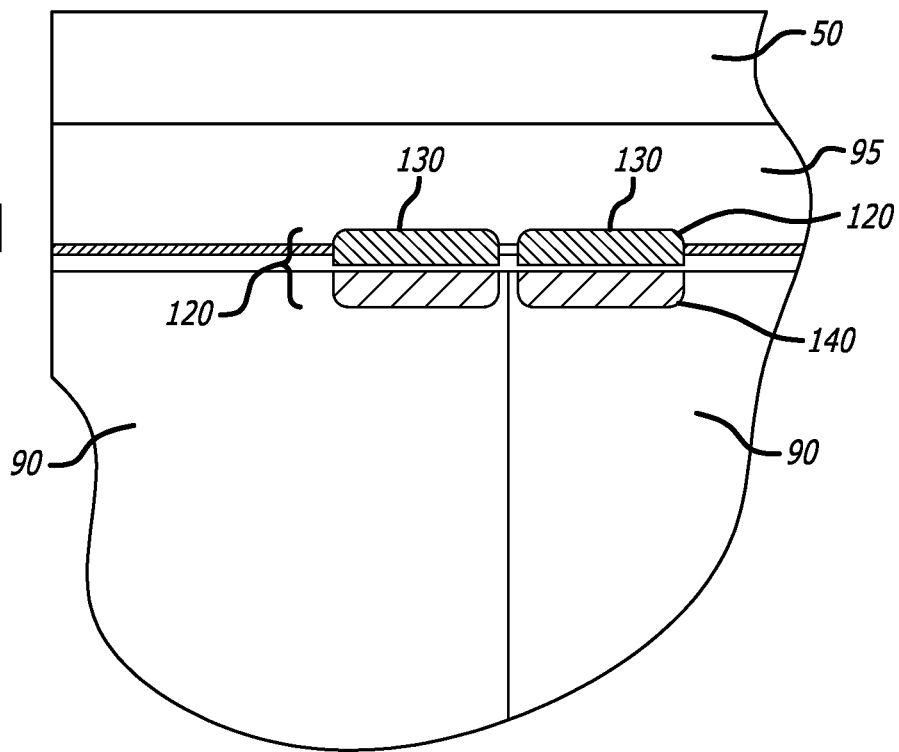
FIG. 3a is an enlarged front view of the galley door and word deck showing the sensor position.
Figure 3B:
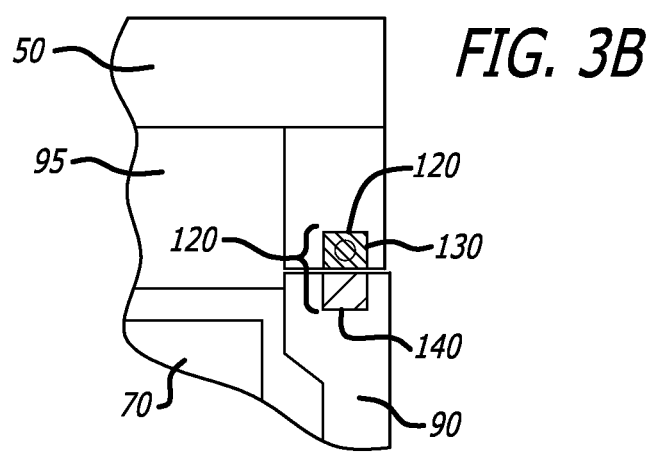

FIGS. 3a,b show portions of the cart 70 in the cart bay 80 behind the cart bay door 90 below the work deck 50. To detect when the cart bay doors 90 are opened, a door sensor 120 is mounted above or adjacent the door 90, which may be the work deck 50, the galley frame, the floor, or some other location. The sensor 120 may include a transmitter 130 and a reflector 140, which when in proximity to each other form an electrical circuit. The transmitter 130 projects a light that is reflected by the reflector 140, establishing that the cart bay door 90 is closed (i.e., proximate to the transmitter 130).

When the cart bay door 90 is opened by a flight attendant or the like, which could occur when the cart is being removed for beverage service or when something is retrieved from the cart 70, the motion of the door 70 separates the transmitter 130 from the reflector 140, which breaks the circuit. The break in the circuit is communicated by the transmitter to the chiller, which interprets the broken circuit as the opening of the cart bay door 90. In response to the signal from the transmitter 130, the chiller shuts down the refrigeration cycle and stops chilled air from flowing to the cart bay 80. The cessation of the flow of chilled air can be immediate, or there can be a delay between the signal being sent and the shut off of the system, to allow for quick opening and shutting of the door 90.

Figure 4:
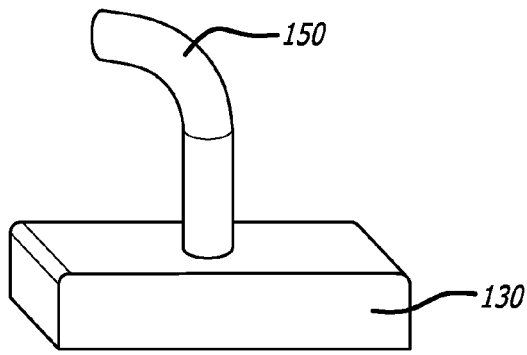
FIG. 4 is an elevated, perspective view of a first sensor and reflector combination.
Figure 5:
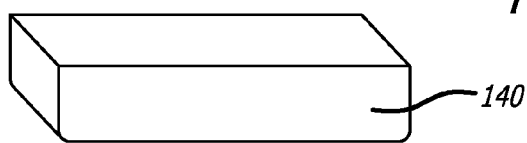
FIG. 5 is an elevated perspective view of a second sensor and reflector combination.
Figure 5:
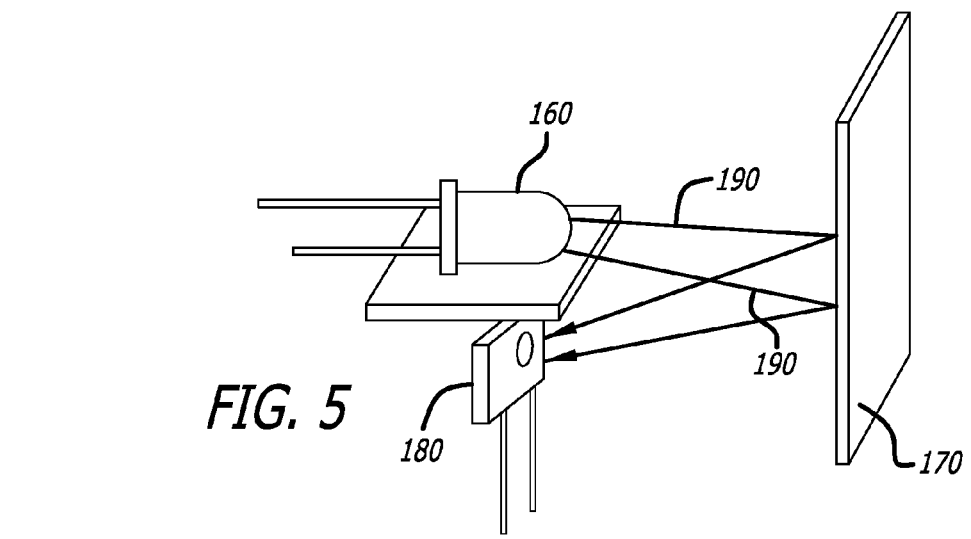
Figure 6:
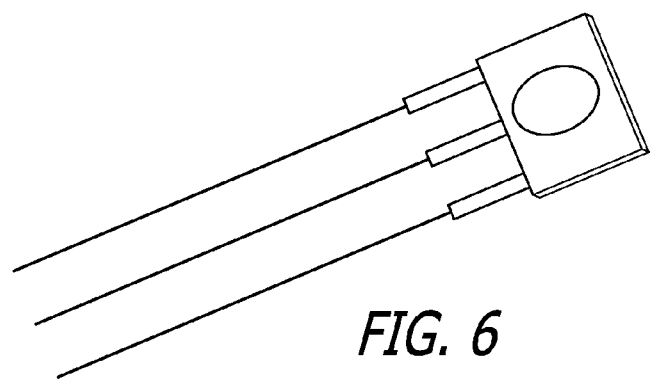
FIG. 6 is an elevated perspective view of a third sensor of the present invention.

FIG. 4 illustrates an example of a sensor 120 that can be used with the present invention. The sensor 120 can be either magnetic, an IR transmitter and reflector, LED transmitter and reflector, or the like, comprising a transmitter 130 and a reflector 140. A cable 150 leads to the processor (not shown) that connects the chiller system and transmits the signal when the circuit is broken. FIG. 5 illustrates another alternative sensor in which a IR LED transmitter 160 is placed proximal to a reflective surface 170, which in turn is proximate an IR photo transistor 180. Light 190 emitted from the transmitter 160 bounces off the reflective surface 170 and is received by the photo transistor 180 to complete the circuit. The reflective surface 170 could be the cart bay door 90, so that when the cart bay door 90 is opened, the circuit is broken and a signal is sent via to the processor to shut down the chiller system. Another embodiment involves placing magnets in the cart bay door 90 adjacent a fixed magnetic sensor 200 (FIG. 6), such that when the magnetic sensor 200 detects the magnet the circuit is closed. When the door is opened, the sensor 200 will not detect the magnet and the circuit is open, leading to a signal being sent to the processor.

Figure 7:
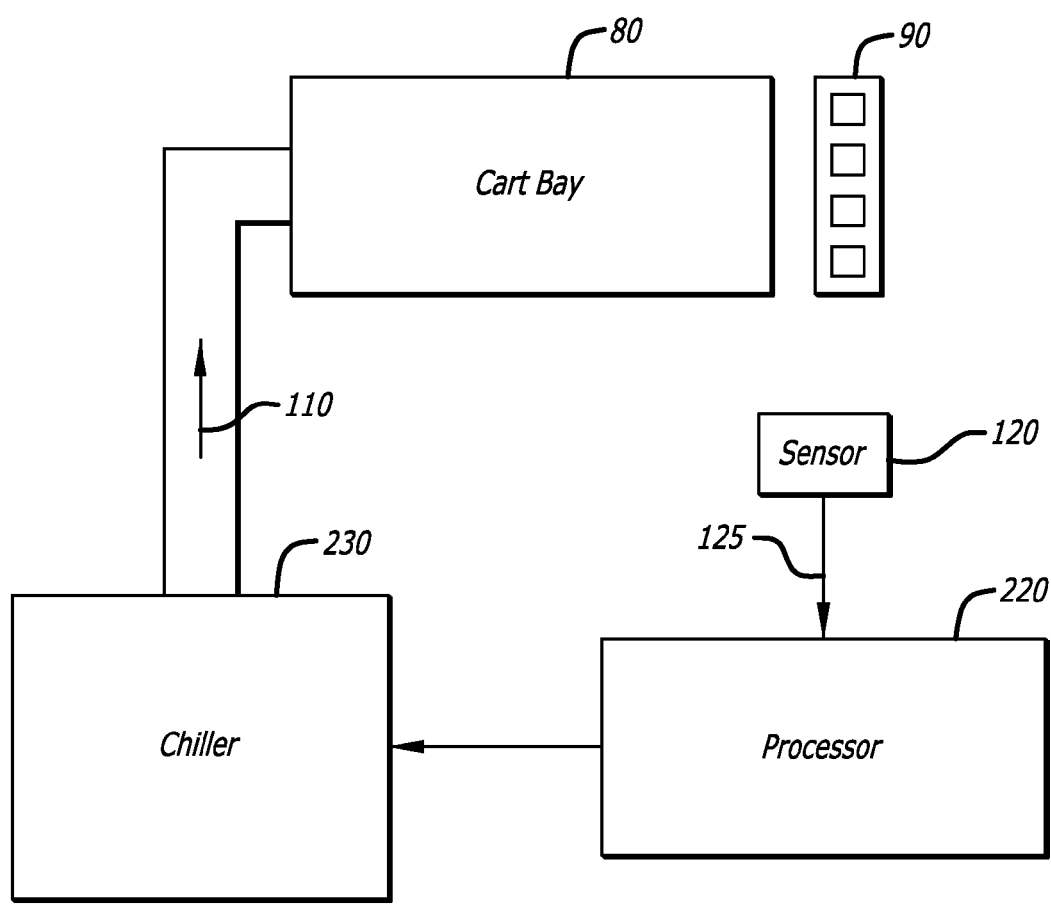
FIG. 7 is a schematic of the interlock and chiller system of the present invention.

FIG. 7 is a schematic of the system of the present invention. The cart bay 80 receives chilled air 110 from a chiller 230. The cart bay door 90 moves away from the cart bay 80 when it is opened, and this movement is sensed by a sensor 120. When the sensor 120 determines that the door 90 is opened, it sends a signal 125 to a processor 220 to deactivate the chiller 230. Once the door 90 is closed, the sensor 120 sends a signal 125 to the processor 220 to reengage the chiller 230 and once again send chilled air 110 is sent to the cart bay 80.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. An aircraft galley beverage cart cooling system including an aircraft refrigeration system integrated into an aircraft galley, comprising:
    a removable galley beverage cart;
    a galley bay adapted to house the removable galley beverage cart, the galley bay including a door for enclosing the bay;

a cooling system for producing chilled air to the galley bay, including a processor for activating and deactivating the cooling system;

a mechanical sensor for determining when the door is open and closed, the mechanical sensor connected to the processor;

wherein the mechanical sensor sends a signal to the processor to deactivate the cooling system when the sensor determines that the door is opened.

2. The aircraft galley beverage cart cooling system of claim 1, wherein the mechanical sensor is a microswitch.

3. An aircraft galley beverage cart cooling system including an aircraft refrigeration system integrated into an aircraft galley, comprising:

a removable galley beverage cart;

a galley bay adapted to house the removable galley beverage cart, the galley bay including a door for enclosing the bay;

a cooling system for producing chilled air to the galley bay, including a processor for activating and deactivating the cooling system;

a sensor for determining when the door is open and closed, the sensor connected to the processor;

wherein the sensor sends a signal to the processor to deactivate the cooling system when the sensor determines that the door is opened; and wherein the sensor is a magnetic sensor.

4. The aircraft galley beverage cart cooling system of claim 1, wherein the sensor is mounted above the galley cart door.

5. An aircraft galley beverage cart cooling system including an aircraft refrigeration system integrated into an aircraft galley, comprising:

a removable galley beverage cart;

a galley bay adapted to house the removable galley beverage cart, the galley bay including a door for enclosing the bay;

a cooling system for producing chilled air to the galley bay, including a processor for activating and deactivating the cooling system;

a sensor for determining when the door is open and closed, the sensor connected to the processor;

wherein the sensor sends a signal to the processor to deactivate the cooling system when the sensor determines that the door is opened; and wherein the sensor comprises an IR LED and an IR photo-transistor for determining a status of the door.

6. The aircraft galley beverage cart cooling system of claim 1, wherein the cooling system disconnects after a delay when the mechanical sensor determines that the door is opened.

7. A method for reducing an introduction of ambient air into an aircraft chiller system used to cool a galley compartment, the method comprising:

providing a ducting from a chiller system to the compartment;

introducing chilled air into the compartment;

locating a mechanical sensor adjacent a compartment door, the mechanical sensor adapted to determine when the door is open and closed;

causing a signal to be sent to the chiller system when the mechanical sensor determines that the door is opened; and halting the introduction of chilled air into the compartment when the signal is received.

8. The method for reducing an introduction of ambient air of claim 7, wherein the compartment is a beverage cart bay.

9. The method for reducing an introduction of ambient air of claim 7, wherein the mechanical sensor is a microswitch.

10. A method for reducing an introduction of ambient air into an aircraft chiller system used to cool a galley compartment, the method comprising:

providing a ducting from a chiller system to the compartment;

introducing chilled air into the compartment;

locating a magnetic sensor adjacent a compartment door, the magnetic sensor adapted to determine when the door is open and closed;

causing a signal to be sent to the chiller system when the magnetic sensor determines that the door is opened; and halting the introduction of chilled air into the compartment when the signal is received.

11. A method for reducing an introduction of ambient air into an aircraft chiller system used to cool a galley compartment, the method comprising:

providing a ducting from a chiller system to the compartment;

introducing chilled air into the compartment;

locating a sensor adjacent a compartment door, the sensor adapted to determine when the door is open and closed;

causing a signal to be sent to the chiller system when the sensor determines that the door is opened; and halting the introduction of chilled air into the compartment when the signal is received;

wherein the sensor uses infrared light.

12. The method for reducing an introduction of ambient air of claim 7, wherein the sensor is mounted to a work deck of a galley.

* * * * *